United States Patent
Bryson

[15] 3,663,245
[45] May 16, 1972

[54] FOREHEARTH COLOR CONCENTRATE
[72] Inventor: Robert O. Bryson, Euclid, Ohio
[73] Assignee: Ferro Corporation, Cleveland, Ohio
[22] Filed: Oct. 31, 1969
[21] Appl. No.: 873,129

[52] U.S. Cl. ................................................................106/52
[51] Int. Cl. .....................C03c 3/04, C03c 1/00, C03c 1/10
[58] Field of Search......................................................106/52, 313/89; 252

[56] References Cited

UNITED STATES PATENTS

| | | | |
|---|---|---|---|
| 3,024,121 | 3/1962 | Hagedorn | 106/52 |
| 3,364,041 | 1/1968 | Swain, Jr. et al. | 106/52 |
| 3,498,806 | 3/1970 | Hammer et al. | 106/52 |
| 3,513,003 | 5/1970 | Hammer et al. | 106/52 |

Primary Examiner—Tobias E. Levow
Assistant Examiner—M. Bell
Attorney—Milton L. Simmons

[57] ABSTRACT

Forehearth color concentrates for coloring molten clear base glass in a glass furnace forehearth after melting and fining, comprising a non-smelted interspersion of a flux and colorant. Suitable fluxes are those materials which are compatible with the glass and which promote the fusion and dispersion of the colorant. Suitable fluxes include the alkali borates, boric acid, alkali phosphates, orthophosphoric acid, alkali silicates, fluosilic acid, alkali fluorides, alkali salts, alkali hydroxides, mixtures and reaction products of said fluxes. Alkali silicates and particularly sodium silicates are preferred. Suitable colorants include color indicating metals, color inducing metal oxides or compounds which contain a color inducing metal oxide.

8 Claims, No Drawings

FOREHEARTH COLOR CONCENTRATE

This invention relates to forehearth color concentrates, to a method for their preparation and to a method for coloring container glasses.

The manufacture of colored glass by the addition of a color enriched frit glass to a molten colorless base glass flowing through a forehearth from a melting tank is commonly employed. This process makes possible the manufacture of both colored glass items and colorless glass items from a single melting furnace having multiple forehearths. In the forehearth coloration process, a frit glass is metered into the molten base glass after the base glass flows from the fining zone of the furnace into the forehearth. Generally a vibratory feeder is used.

One of the difficulties encountered heretofore, however, is that colored frit could not be manufactured containing more than a minor amount of color inducing metal (normally the metal oxide) or the metal oxide would not be taken into solution in the molten glass color and consequently would agglomerate or precipitate and appear in the frit, and subsequently in the glass to be colored, as inclusions or specks. The amount of metal oxide which could be taken into solution in the frit varied depending on the metal oxide. For example, although about 25% CuO can be taken into solution in the frit smelt, only about 2% $Cr_2O_3$ can be taken into solution.

It has now been discovered however, that a forehearth color concentrate can be prepared which contains color inducing metal oxides, compounds which contain a color inducing metal oxide or color inducing metals (all of which are alternatively referred to herein as colorants) in substantially greater amounts than previously employed color frits and which obviates the need for employing frits.

For example, in accordance with this invention, a color concentrate can be prepared having no agglomerated metal oxides which contains more than 20% of the less soluble color inducing metal oxides such as $Cr_2O_3$. In addition, whereas previous color inducing metal oxides were taken into solution in a glass frit by smelting with a blend of glass-formers and fluxes at a temperature in the range of 2,250°-2,600° F. and then the molten mix fed from the smelter to a body of water to break up the frit into granulated form, or quenched through water cooled rolls to form a ribbon which was subsequently broken to form flakes, the concentrate of the invention can be blended at room temperature. Moreover the concentrate of the invention is more quickly and completely dispersed and dissolved when added to the molten base glass than the previously employed frits.

More particularly the invention forehearth color concentrate comprises a non-smelted intimate admixture of interspersion of a flux or fluxes, with one or more colorants (usually a metal oxide).

For the purposes of this invention the flux can be defined as any substance which is compatible with the glass and which promotes the fusion and dispersion of the colorant. The flux acts to locally and temporarily reduce the fusion temperature between the colorant and the glass batch for a time sufficient to permit rapid and thorough dispersement of the colorant through the glass batch with the flux subsequently being dispersed and diluted within the glass so that it does not alter the glass's basic characteristics.

Suitable fluxes include alkali borates, boric acid, alkali phosphates, orthophosphoric acid, alkali silicates, fluosilic acid, alkali fluorides, alkali salts, alkali hydroxides and mixtures.

Suitable alkali cations include the alkali metals such as sodium, potassium and lithium and the alkaline earth metals such as calcium, magnesium and barium.

Suitable alkali borates which can be employed as fluxes in the invention include borax, potassium pentaborate, potassium metaborate, potassium tetraborate and calcium borate. Among the alkali phosphates which can be employed are hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate and sodium tetrametaphosphate. Suitable alkali silicates include sodium silicate, potassium silicate, sodium fluosilicate and calcium fluosilicate. Suitable alkali fluorides include sodium aluminum fluoride, calcium fluoride, lithium fluoride, anhydrous potassium fluoride, potassium fluoride dihydrate, potassium bifluoride and sodium fluoride. Suitable alkali salts include sodium carbonate and barium carbonate. Suitable alkali hydroxides include sodium hydroxide, lithium hydroxide and potassium hydroxide.

The preferred fluxes however are the alkali silicates formed from alkali metals such as potassium, lithium and sodium. The alkali metal silicates are preferred because they generally will combine with larger amounts of colorant than the other fluxes and are readily dispersed when added to the forehearth. Moreover these silicates are compatible with most commercial glasses.

Of the alkali silicates, the silicate of sodium is preferred.

The color concentrates will generally contain from about 50 to about 99.9 percent by weight of flux and about 0.1 to about 50 percent by weight of colorant. Any of the commonly employed color inducing metal oxides can be employed in the concentrate. Illustrative of suitable color inducing metals are chromium, copper, iron, cobalt, manganese, vanadium, nickle, uranium, cerium and cerium-titanium and some rare earth oxides such as neodymium oxide, praseodymium oxide and mixtures which are usually added in the form of their oxides. Selenium is exemplary of a color inducing metal which need not be added in the form of its oxide.

The concentrate is preferably a bound or intimate admixture of flux and colorant. A powder concentrate can be employed but it is not generally preferred because of the dust problem. That is the powder contaminates the plant equipment and other products being processed, and tends to be blown back out of the glass tank by convection currents resulting from the extremely high glass tank temperatures.

The color concentrate can be prepared by blending the colorant and flux with a commercial high speed blender or ball mill. When an aqueous alkali silicate is employed as the flux, the mixture can be blended until a complete viscous syrupy mixture results, and then dried to form a tacky dough-like mixture by subjecting the mixture to heat lamps or an oven at relatively low temperatures of between about 100° F. and about 500° F. for a time between about 1 minute and about 1 hour. Alternatively, however the concentrate can be spray dried and then formed into pellets or shots and the like by employing conventional equipment. The dry fluxes can be formed into shot or pellets and the like by conventional methods. For example, a Komarek-Greaves Compacter can be used to form the powder into briquets, using a small amount of water or other suitable substance as a binder.

Another method of producing the concentrate in commercial form when an alkali silicate is employed as the flux is to lower the pH of the aqueous silicate-colorant dispersion by addition of a suitable acid such as boric acid, phosphoric acid or hydrochloric acid. This method results in the formation of a non-sticky agglomerate which can then be dehydrated and compacted if desired.

Any of the conventional silica type base glasses are adaptable to be colored with the color concentrate of the invention. The silica type glasses generally contain the following oxides in the indicated percentages.

TABLE 1

| Oxide | Percent by Weight |
|---|---|
| $SiO_2$ | 60-75 |

| | |
|---|---|
| $Al_2O_3$ | 0.3–10 |
| CaO+MgO | 6–15 |
| $Na_2O$ | 12–18 |
| $K_2O$ | 0–5 |
| BaO | 0–5 |
| Fe | .00025–.0035 |

Other suitable glasses are reported in Kirk-Othmer; Encyclopedia of Chemical Technology, 2nd Edition, Volume 10, Table 3, Pages 542–3. As is readily apparent to one skilled in the art, however, not all of the fluxes of the invention are suitable for every type of glass. Thus the particular flux selected will depend on its compatibility with the particular components of the base glass.

The following examples will serve to illustrate the invention and its preferred embodiments. Unless otherwise indicated, all percentages and parts are by weight.

EXAMPLE 1

400 grams of sodium silicate containing 9.1% $Na_2O$ and 29.6% $SiO_2$ ($Na_2O:SiO_2$ ratio of 1:3.25) was blended with 25 grams of pigment grade $Cr_2O_3$ in an Osterizer blender at high speed. The mixture was then dried under an infrared lamp for approximately 5 minutes and then rolled into balls and dried at a temperature of about 230° F. for 30 minutes, until the material was no longer tacky. The color concentrate balls (30 grams) were then added to 500 grams of a molten glass comprising the following oxides in the percentages indicated,

| | |
|---|---|
| $SiO_2$ | 71.53% |
| $B_2O_3$ | 0.48 |
| $Na_2O$ | 13.30 |
| $K_2O$ | 0.40 |
| CaO | 9.16 |
| F | 0.16 |
| $Al_2O_3$ | 1.83 |
| BaO | 0.60 |
| MgO | 2.43 |
| $As_2O_3$ | 0.12 | and the color concentrate containing 13.9% $Cr_2O_3$ was completely melted and dispersed in about 2 minutes. The glass was then formed into flat colored disks approximately one-eighth inch thick and 5 inches in diameter by pressing the molten glass. No inclusions or undissolved crystalline materials were noted in the glass indicating that thorough dispersion of the $Cr_2O_3$ was achieved.

EXAMPLE 2

In accordance with the procedure of Example 1, 500 grams of sodium silicate and 50 grams of pigment grade calcined $Cr_2O_3$ were blended and dried and 10 grams of the concentrate added to 500 grams of the aforesaid base glass. The concentrate (containing 20.5% $Cr_2O_3$) was quickly melted and dispersed in the base glass and a glass disk prepared from the colored glass was free of inclusions.

EXAMPLE 3

In accordance with the procedure of Example 1, color concentrates were made from the following ingredients.

| Composition | Color | % pigment in concentrate based on total solids |
|---|---|---|
| 1. 250 grams sodium silicate 50 grams CuO | Blue-Green | 34.01 |
| 2. 250 grams sodium silicate 50 grams $NiO_2$ | Brown | 33.33 |
| 3. 250 grams sodium silicate 10 grams $Co_2O_3$ | Blue | 9.35 |
| 4. 250 grams sodium silicate 50 grams $Fe_2O_3$ | Green | 34.01 |

Glass disks prepared from the aforesaid compositions in accordance with the procedure of Example 1 were transparent and free of inclusions, indicating through dispersion of the metal oxides.

EXAMPLE 4

A composition comprising 3,000 parts of an aqueous sodium silicate (29.6% $SiO_2$), 20.5 grams sodium selenate and 36.3 grams of black nickle oxide were blended in a Cowles Dissolver for 20 minutes and then placed in a gas muffle furnace for approximately 15 minutes at 1,000° F. The resultant foam like material was milled in a ball mill for one-half hour and then pelletized in a Komarek-Greaves Compacter. The pellets were then added to a commercial glass tank forehearth through which a conventional clear glass was being run, and the concentrate was quickly melted and dispersed in the clear base glass, which was of conventional composition. Discs prepared from the resultant salmon colored glass in accordance with the aforesaid procedure were free of inclusions.

The following examples will illustrate compositions employing concentrates which were prepared by dry mixing the flux and color inducing metal oxides.

EXAMPLE 5

A concentrate consisting of 25.8 parts of dry frit grade sodium silicate (75.8% $SiO_2$), 1.26 parts sodium selenate, and 1.5 parts black nickle oxide was milled 2 hours in a ball mill, pelletized with a Komarek-Greaves Compacter. The pellets were then added to a forehearth as in Example 4, and the concentrate was quickly melted and dispersed in the clear base glass. Discs prepared from the resultant salmon colored glass in accordance with the aforesaid procedure were free of inclusions.

EXAMPLE 6

In accordance with the procedure of Example 5 glass discs were prepared from the following ingredients in the indicated proportions and the discs were free of inclusions.

| Ingredients | Parts By Weight | | | |
|---|---|---|---|---|
| Sodium Silicate | 360 | 360 | 360 | 360 |
| Nickel Oxide | 10 | 30 | 60 | 60 |
| Sodium Selenate | 5 | 15 | 10 | 30 |

EXAMPLE 7

In accordance with the procedure of Example 5 the following compositions containing approximately 10 percent uranium dioxide were prepared, and no inclusions were noted.

| Ingredients | Parts by Weight | | | |
|---|---|---|---|---|
| Sodium Silicate | 360 | 360 | 360 | 360 |
| Uranium Dioxide | 46 | 46 | 46 | 46 |
| Nickel Oxide | — | 0.1 | 1 | — |
| Sodium Selenate | — | — | — | 5 |
| Ammonium Nitrate | 20 | 20 | 20 | 20 |

EXAMPLE 8

In accordance with the procedure of Example 5 discs were prepared from the following ingredients containing approximately 6.25% $Cr_2O_3$ and no inclusions were noted.

| Ingredients | Parts by Weight | | | |
|---|---|---|---|---|
| Sodium Silicate | 375 | — | — | — |
| Frit Makers Borax | — | 375 | — | — |
| Sodium Nitrate | — | — | 375 | — |
| Sodium Nitrite | — | — | — | 375 |
| $Cr_2O_3$ | 25 | 25 | 25 | 25 |

EXAMPLES 9 – 12

In accordance with the procedure of Example 5 the following compositions were prepared employing respectively, lithium carbonate, boric acid, potassium carbonate and lithium metasilicate as the flux and containing approximately 12.5% $Cr_2O_3$. No inclusions were noted when glass discs were made incorporating these compositions.

| Ingredients | Parts By Weight | | | |
|---|---|---|---|---|
| Lithium Carbonate | 877 | — | — | — |
| Anhydrous Boric Acid | — | 350 | — | — |
| Potassium Carbonate | — | — | 519 | — |
| Lithium Metasilicate | — | — | — | 350 |
| $Cr_2O_3$ | 50 | 50 | 50 | 50 |

EXAMPLES 13 – 16

In accordance with the procedure of Example 5 the following brown compositions were prepared employing dry sodium silicate, sodium carbonate, sodium nitrate, borax and caustic soda as the fluxes. All were free of inclusions when made into glass discs.

| Ingredients | Parts By Weight | | | |
|---|---|---|---|---|
| Anhydrous Boric Acid | 52 (10% $B_2O_3$) | — | 52 | 456 |
| Red Iron Oxide | 11 (2.25% $Fe_2O_3$) | 11 | 11 | 11 |
| Nickel Carbonate | 68 (8.50% NiO) | 68 | 68 | 68 |
| Sodium Silicate | 396 | — | — | — |
| Sodium Carbonate | — | 572 | — | — |
| Sodium Nitrate | — | 100 | — | — |
| Borax | — | 77 | — | — |
| Caustic Soda | — | — | 512 | — |

EXAMPLE 17

In accordance with the procedure of Example 5 brown colored glasses were prepared from a concentrate comprising dry sodium silicate, nickle carbonate and sodium selenate wherein the nickle was present in concentrations of from 4 to about 8 percent. Lavender blue glasses prepared from dry sodium silicate and potassium permanganate ($KM_nO_4$); and black glasses prepared from dry sodium silicate, manganese dioxide ($M_nO_2$) and sodium dichromate ($Na_2Cr_2O_7 \cdot 2H_2O$) were prepared and likewise found to have no inclusions.

Other suitable fluxes include tetrapotassium pyrophosphate, fluosilic acid, calcium fluoride, and monoammonium phosphate.

When the aforesaid color concentrates of the invention are added to a body of molten clear glass in a glass furnace forehearth after melting and fining of the clear glass, the concentrates are readily dispersed and the resultant colored glass free of inclusions.

As is known to those skilled in the art, smelting is the melting of glass raw materials in a melting furnace around 2,500° F. The raw materials which have been first thoroughly mixed are loaded into the smelter and allowed to remain there until thoroughly and uniformly melted. This melting process requires from one to 3 hours time. The molten glass then runs from the furnace in a white hot stream and the contact with the cold water in the quenching tank shatters the glass into millions of friable pieces which are known as frit. But in accordance with the aforesaid invention, the expensive and time consuming operation of smelting a fritted color concentrate, for subsequently coloring container glass in the forehearth, has been obviated.

At the same time, a much higher concentration of coloring oxide is possible in the color concentrate of this invention than could ever be achieved in a fritted concentrate.

The results of this invention being totally unexpected as it had heretofore been the belief that such refractory color oxides as $Cr_2O_3$ could not possibly be effectively dispersed in a glass, without the intermediate step of first dissolving them in a frit, prior to their introduction into a forehearth.

What is claimed is:

1. A forehearth color concentrate consisting essentially of, as a non-smelted pelletized interspersion, a colorant oxide and a flux in from about 50.0 weight percent to about 99.9 weight percent flux, and a forehearth soluble amount of colorant oxide, to a maximum of 50.0 weight percent thereof, dispersed throughout said interspersion as discrete, unreacted particles, said colorant oxide consisting essentially of $Cr_2O_3$, and said flux consisting essentially of an alkali silicate.

2. A forehearth color concentrate consisting essentially of, as a non-smelted pelletized interspersion, a colorant oxide and a flux, in from about 0.1 weight percent to about 20.5 weight percent colorant oxide, and from about 79.5 weight percent to about 99.9 weight percent flux, said colorant oxide consisting essentially of $Cr_2O_3$ dispersed throughout said interspersion as discrete, unreacted particles, and said flux consisting essentially of an alkali silicate.

3. The color concentrate of claim 2 wherein said colorant oxide is present in from about 0.1 to about 13.9 weight percent, and said flux is present in from about 86.1 to about 99.9 weight percent.

4. The color concentrate of claim 2 wherein said colorant oxide is present in from about 0.1 to about 6.25 weight percent, and said flux is present in from about 93.75 to about 99.1 weight percent.

5. The color concentrate of claim 2 wherein said alkali is sodium.

6. The color concentrate of claim 3 wherein said alkali is sodium.

7. The color concentrate of claim 4 wherein said alkali is sodium.

8. The color concentrate of claim 1 wherein said alkali is sodium.

* * * * *